(12) United States Patent
Sato

(10) Patent No.: US 6,625,283 B1
(45) Date of Patent: Sep. 23, 2003

(54) SINGLE HAND KEYPAD SYSTEM

(76) Inventor: Hisashi Sato, 19-30-4, Chuo 1-chome, Kokubu-shi, Kagoshima (JP)

( * ) Notice: Subject to any disclaimer, the term of this patent is extended or adjusted under 35 U.S.C. 154(b) by 0 days.

(21) Appl. No.: 09/566,601

(22) Filed: May 8, 2000

(30) Foreign Application Priority Data

May 19, 1999 (JP) .......................................... 11-177317
Oct. 18, 1999 (JP) .......................................... 11-331738

(51) Int. Cl.$^7$ .............................................. H04M 1/00
(52) U.S. Cl. ............................ 379/433.07; 379/433.06; 379/368
(58) Field of Search ....................... 379/433.06, 433.07, 379/368; 345/169; 361/683; 455/90, 575

(56) References Cited

U.S. PATENT DOCUMENTS 5,404,267 A * 4/1995 Silva et al. ................. 361/683
5,473,346 A * 12/1995 Pollack ....................... 345/169
5,841,849 A * 11/1998 Macor ................... 379/433.06

* cited by examiner

Primary Examiner—Jack Chiang
(74) Attorney, Agent, or Firm—Koda & Androlia

(57) ABSTRACT

A keypad system for a compact electronic machine featuring word processing capability has five keys located on the side walls of electronic machine in order to allow quick and easy entry of alpha numerical information with single hand. Alpha numeric characters are assigned to combinations of electrically-on status and electrically-off status of five keys suitably according to finger movement, usage frequency, and mnemonic manner in order to achieve fast entry speed. The unique location of keys also allows for a relatively large display or mouse ball on the front or bottom surface.

7 Claims, 3 Drawing Sheets

SINGLE HAND KEYPAD SYSTEM

BACKGROUND OF INVENTION

1. Field of the invention

The invention described here relates to an apparatus and a method of alpha numeric data entry into small electronic devices equipped with word processing capability, such as portable computers, potable data processors, and mobile phones.

2. Description of the Prior Art

Electronic devices with word processing capability require miniaturization, space efficiency, and a relatively large display. Therefore, decreasing keypad area is necessary.

Since miniaturization of keypads is reaching its limit, there have been various approaches to decrease the quantity of keys.

A conventional telephone keypad has been proposed for inputting alpha numeric information into a device by means of numerical keyboard.

U.S. Pat. No. 4,658,417 proposed to locate the desired letters on the telephone keypad and to press the corresponding key either once, twice, or three times, followed by pressing an additional symbol key, for example, pressing key 7 three times will give letter "S".

U.S. Pat. No. 5,339,358 proposed a method and apparatus for conversion of a standard ten-key keypad into a data entry by prearranged alphabetical letters with adjacent key pairs to be defined for each alphabetic letter.

There were other inventions which proposed a lower key count than a ten-key keypad.

U.S. Pat. No. 4,360,892 proposed five manually operated finger keys on a keyboard surface, four finger keys and at least one thumb key, being provided a methods of encoding alphabetic characters with pictographic relationship among each key combination.

Japanese laid-open Patent Application No.H6-274257 and U.S. Pat. No. 4,791,408 also proposed a five-key entry system on a keyboard surface, or top and bottom surfaces, providing a method of encoding alphabetic characters with plural entry positions on each key.

U.S. Pat. No. 5,281,966 proposed a five-key entry system on a keyboard surface providing a method of encoding alphabetic characters by assigning characters by alphabetical order using vowels as root chords for following consonants.

These previous inventions of five-key keypads were designed for the keyboard device itself. There were none where consideration had to be given to space for a display.

These previous inventions of five-key keypads is worked from a mnemonic stand point, but very little consideration was given to on entry speed, which must be determined by relating key assignment to human finger movement and usage frequency.

SUMMARY OF THE INVENTION a) Objectives

The general objective of the present invention is to provide compact electronic devices which have word processing capability with a means of entering data with at least five keys, overcoming the difficulties above and affording other features and advantages heretofore not available.

A specific objective of the present invention is to allow a relatively large display on a keyboard equipped with alpha numerical data entry keys.

Another specific objective of the present invention is to provide a method of operating five keys that enables the user to enter data at high speeds.

Yet another specific objective of the present invention is to allow one-handed data entry, and enable tactile data entry.

A further specific objective of the present invention is to provide a key-entry mouse unit.

A further more specific objective of the present invention is to provide a multi-service data processing, such as data handling and phone assistance, with a five-key keypad.

b) Summary of the Invention

The present invention of one-hand alpha numerical data entry comprises the following components:

The five keys for alpha numerical data entry are located on the sides of a portable electronic device with word processing capability. A display is on the front face of the device. The positioning of keys on the sides allows the display area to be made larger.

The five keys can also be located on the side of a mouse pad for a computer, so that operator does not need to use keyboard and mouse together, but only the mouse pad. The implementation of the present invention in a mouse pad frees up valuable desk space.

The five keys located on the sides of an electronic device are located at finger positions where operator naturally grips the device. The first key for the thumb is located on one side surface of the device. The other four keys for the four fingers are located on the other side surface.

A foldaway hook can be equipped on a portable device to help fixing the device in palm.

Each key has electrically-on status when it is pushed, and electrically-off status when it is released.

The five keys can theoretically generate thirty one combinations. Among thirty one combinations, twenty six are used for alphabetical assignment.

Alpha numerical characters are assigned to key combinations to obtain the highest entry speed. Therefore frequency of usage, finger movement, and mnemonic manner must be considered and examined. For instance, a more often used character is assigned to a key combination of easier and higher speed finger movement.

Other characters or commands can be assigned to the remaining key combinations, using hierarchy structure of assignment.

DETAILED DESCRIPTION OF THE PREFERRED EMBODIMENT

Figure 1:
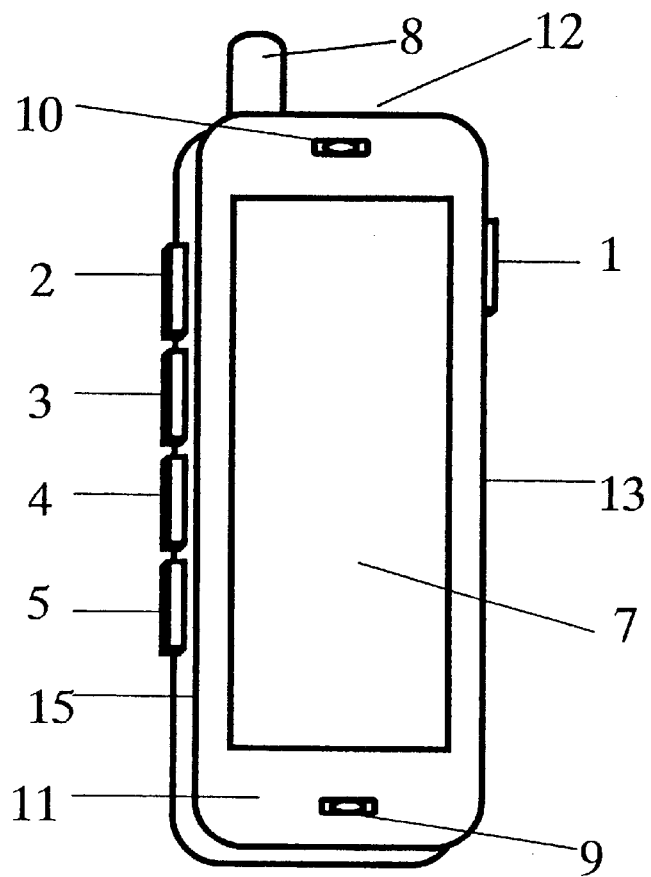
FIG. 1 is a plan view of the preferred embodiment of the present invention of a mobile phone.

Referring to FIG. 1, a preferred embodiment in a mobile phone is illustrated. The mobile phone is equipped with word processing capability for e-mail or Internet.

Display 7, microphone 9, and speaker 10 are located on the front surface 11. Key 1 is located onto the right side surface 13, key 2 through 5 are located on the left side surface 15, and an antenna 8 is located on the top side surface 12.

Figure 2:
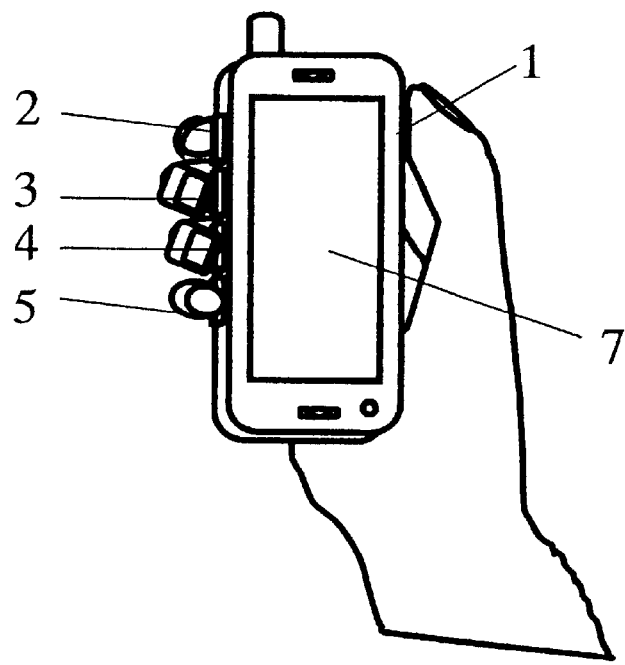
FIG. 2 shows the mobile phone of FIG. 1 being held in a hand.

As shown in FIG. 2, the thumb will be on key 1, the forefinger on key 2, the middle finger on key 3, the third finger on key 4, and the little finger on key 5, when the phone is gripped with the right hand. A mirror image key arrangement is also possible for a left handed user. The key position and size are considered carefully to mach the hand and finger size of the average user. More keys, buttons or indicators can be put on the device for additional functions as desired.

Figure 3:
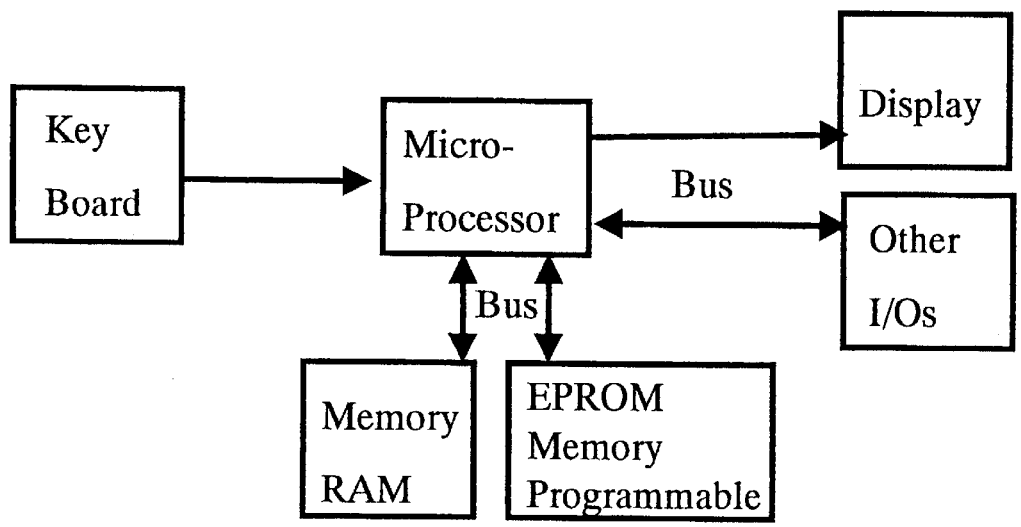
FIG. 3 is a schematic block diagram of the digital logic signal line connected to an associated programmable microprocessor.

Each key has electrically-on status when it is pushed and electrically-off status when it is released. The electrical signal goes to a microprocessor. FIG. 3 shows a schematic block diagram of the digital logic signal line connected to an associated programmable microprocessor, where the inputs are translated to alpha numeric characters or commands. The microprocessor is connected to RAM and EPROM through the bus line. It is possible to install a data processor between the keypad and the microprocessor to interpret a keypad status to a signal for the microprocessor.

The microprocessor takes input information, after a preset time has elapsed without any interruption of keypad status after the last key is electrically-on. The time count is reset whenever the keypad status changes, and another time count starts. In the present invention, there is also a second preset time which is longer than the first. When user continuously pushes keys until the second preset time, he can get a different character or command from the first. In the present invention, the user toggles between upper case and lower case by pushing keys until the second preset time has elapsed. It is very convenient to toggle between upper and lower case letters without going back to a special command for letter case size.

In the case of the scrolling function, scrolling on the display starts when the microprocessor takes an input after the first preset time elapsed without any interruption of keypad status after the last key is electrically on. When any key status changes, another time count starts.

It is very useful that the two kinds of preset time can be adjusted according to the users.

Key status is hereafter expressed with "0" for electrically-off, and "1" for electrically-on in order to compose a set of numbers, correspond to the key status from the first key to the fifth key. For example, combination code "10100" means key 1 is electrically-on, key 2 is electrically-off, key 3 is electrically-on, key 4 is electrically-off, and key 5 is electrically-off.

Detailed alpha numerical characters and commands with combination code in the present invention are explained as follows:

An operator can make sentences in text mode. In text mode, letters of the alphabet are assigned in the following manner;

1) Grouping

One of the major objectives of the invention is to provide a code system which is easily memorized. In general, a regular order system is easier to remember than an irregular or random order system. As explained below, however, simple alphabetical order can not be used, because the frequency of character usage must be taken into account. In the present invention, small groups of any relation are chosen from the prioritized list of usage frequency. On the other hand, groups of key combinations are created by considering finger dexterity mentioned below. In this present invention, prioritized groups of key combinations, and prioritized groups of letters are created first, then these groups are assigned along with the prioritized order, and finally, each letter is assigned to each combination code respectively within the assigned grouping.

2) Finger Dexterity

The most major objective of the invention is to provide an easy, high speed entry system. In general, all fingers do not have the same level of dexterity.

First, it has been found by experiment that the entry speed is very slow if a five finger combination includes a combination, in which middle finger presses for electrically-on status, third finger releases for electrically-off status, and little finger presses for electrically-on status. This combination should be used as seldom as possible. In the present invention, letter "Q", "X" or "Z" is assigned to this specific key combination.

Second, it has been found by experiment that movement of the thumb does not significantly effect the other fingers, nor is the thumb by the movement of the other fingers.

Third, it has been found by experiment that single finger entry is overall the fastest.

Fourth, it has been found by experiment that an adjacent pair of fingers, excluding the thumb, demonstrates higher entry speed than any other combination of the four fingers overall.

Taking the above into consideration, key combinations are prioritized by lower quantity of electrically-on status as first, neighboring finger pairs second, and thumb status third.

As a result, the following groups of combination code, prioritized by entry speed, are created:

First group: "10000,01000,00100,00010,00001"
Second group: "01100,00110,00011"
Third group: "11000,10100,10010,10001"
Fourth group: "11100,10110,10011"
Fifth group: "01110,00111"

In each group, order of key combination is set by finger order. The thumb is most highly prioritized and the other fingers follow from the forefinger to the little finger. Then, 5 groups of 17 combination codes for high speed entry are chosen.

3) Usage Frequency

High entry speed is basically performed by assigning easy key combinations to frequently used letters. Vowels are used more than 50% of the time in Japanese and some other languages which consonants are normally followed by vowel. Vowels are used in English frequently, too. In the present invention, "A,E,I,O,U" is set on the first group.

In English, the most frequent usage as a sectional group of successive alphabetic order is the second group "R,S,T". The next most frequent usage is third group "K,L,M,N". The next most frequent usage is the fourth group "B,C,D". The next most frequent usage is the fifth group "G,H". Then, 5 groups of 17 letters are selected. Sentences consist mostly of the 17 most often used letters.

The alphabetical groups are assigned to the groups of combination code mentioned above in order.

Other letters are assigned with trying to be easier to remember relating the 17 letters. As a result, letters, "F,J,P, Q,V,W,X,Y,Z", are assigned to the combination code, "01011,01001,01010,01101,11010,11001,11101,10111, 11011", respectively.

In the present invention, special commands are also assigned, in addition to the 26 combination codes of letters.

First, key combination "11111" is set aside for exchanging alphabet mode and edit(numbers) mode. In the edit(number)

mode, 10 digits and any editing commands are obtained with hierarchy command structure, such as saving and loading files, erasing and moving text, copying and pasting text, scrolling and marking text, inputting special symbols or characters, etc.

Some symbols or letters which are used frequently are also included on the remaining key combination of text mode. The following ones are chosen and assigned: "10101" for undo, "11110" for comma, "01111" for space, "00101" for switching between English mode and other language mode. The last one might not be necessary in an English speaking country, and can be changed to another command or a letter. In other language mode, as one example, alphabetical input which is usually phonetic based is translated to the other language automatically in the display by a pre-installed program. The other example of other language mode is to change to native alphabet which characteristics are assigned to different combination codes.

The overall assignment of combination code is summarized in the following list:

| | |
|---|---|
| 10000 : a | (A) |
| 11100 : b | (B) |
| 10110 : c | (C) |
| 10011 : d | (D) |
| 00010 : e | (E) |
| 01011 : f | (F) |
| 01110 : g | (G) |
| 00111 : h | (H) |
| 01000 : i | (I) |
| 01001 : j | (J) |
| 11000 : k | (K) |
| 10100 : l | (L) |
| 10010 : m | (M) |
| 10001 : n | (N) |
| 00001 : o | (O) |
| 01010 : p | (P) |
| 01101 : q | (Q) |
| 01100 : r | (R) |
| 00110 : s | (S) |
| 00011 : t | (T) |
| 00100 : u | (U) |
| 11010 : v | (V) |
| 11001 : w | (W) |
| 11101 : x | (X) |
| 10111 : y | (Y) |
| 11011 : z | (Z) |
| 00101 : Exchange English/Other | |
| 10101 : Undo | |
| 11110 : Comma | (Period) |
| 01111 : Space | |
| 11111 : Exchange Alphabet/Edit&Number | (Exchange Text mode/Phone mode) |

The commands or letters in the parenthesis are obtained when a key combination is held until the second preset time. In the Edit&Number mode, 10 digits are assigned to easy key combinations, and scrolling commands are also prioritized. And then, various editing commands are assigned among the remaining key combinations or further key combinations in hierarchy.

In the present invention, the 10 digits are assigned with consideration given to high speed entry and easy memorization, using the same manner as used for alphabet. The following key combination code are assigned; "10000" for digit 1, "01000" for digit 2, "00100" for digit 3, "00010" for digit 4, "00001" for digit 5, "11000" for digit 6, "01100" for digit 7, "00110" for digit 8, "00011" for digit 9, and "10001" for digit 0.

Scrolling commands are assigned as follows: "11110" for moving upward, "01111" for moving downward, "11100" for moving left, "00111" for moving right, and "01110" for confirmation at the current cursor position.

When the mobile phone is used to dial a number, phone mode is set as the normal mode. Other kinds of handheld electronic devices, such as palm-top personal computers, should be set to text mode for the normal mode.

Some of the major key operations of the phone in phone mode in the present invention are as follows:

An user can dial with "10000" for digit 1, "01000" for digit 2, "00100" for digit 3, "00010" for digit 4, "00001" for digit 5, "11000" for digit 6, "01100" for digit 7, "00110" for digit 8, "00011" for digit 9, and "10001" for digit 0. "10110" for calling, and "10111" for hang up. If the number to be dialed is already memorized in a built-in computer, the number can be chosen by scrolling in display using scrolling command; "11110" for moving upward, "01111" for moving downward, "11100" for moving left, "00111" for moving right, and "01110" for confirmation at the current cursor position. When an user wants to use text mode, "11111" is entered to switch from phone mode to text mode.

Other necessary functions such as recording a new number, sending e-mail, and so on, are also assigned on the remaining key combinations or further key combinations in hierarchy.

Figure 4:
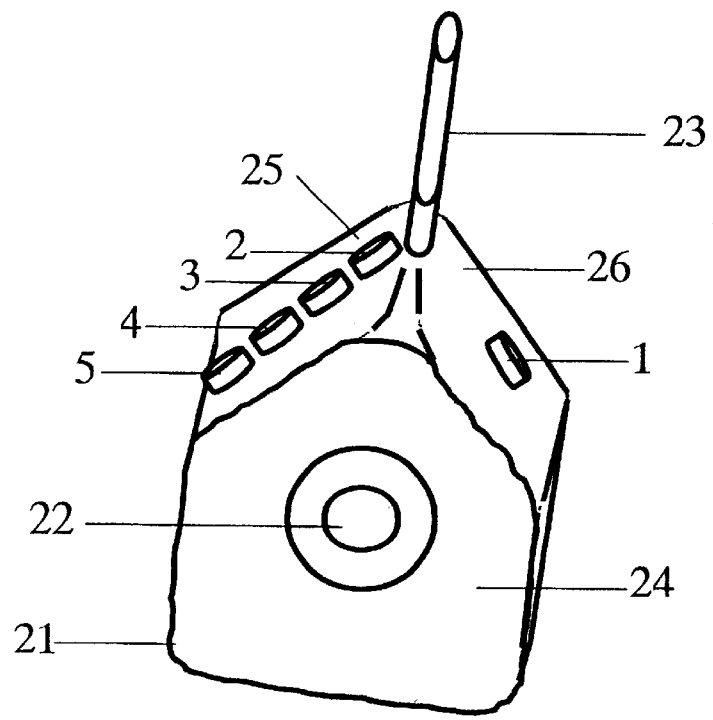
FIG. 4 is a plan view of the preferred embodiment of the present invention in a mouse unit.

FIG. 4 shows five key pad application on mouse unit 21 with scrolling ball unit 22 on the bottom surface 24. The key 1 is on the side surface 26, and the other four keys are on the other side surface 25. The side surfaces can be slanted or rounded for a more comfortable grip. The wire 23 connected to the computer can be replaced by a wireless connection such as infra-red, microwave, or laser transmission. The key board which is usually used along with mouse unit can be taken off the working desk, freeing up valuable desk space.

Figure 5:
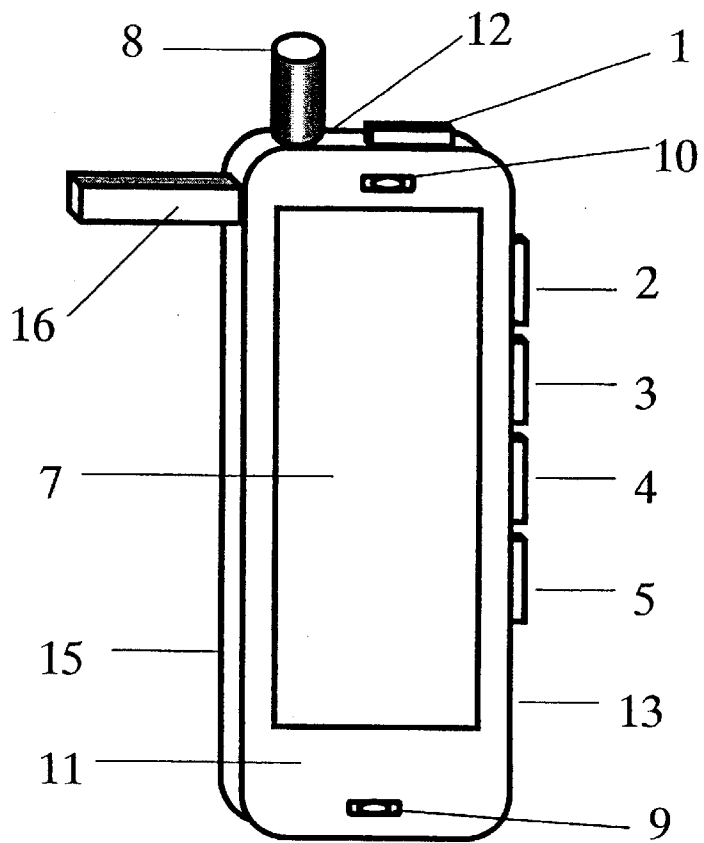
FIG. 5 is a plan view of the preferred embodiment of the present invention of a mobile phone with a foldaway hook.
Figure 6:
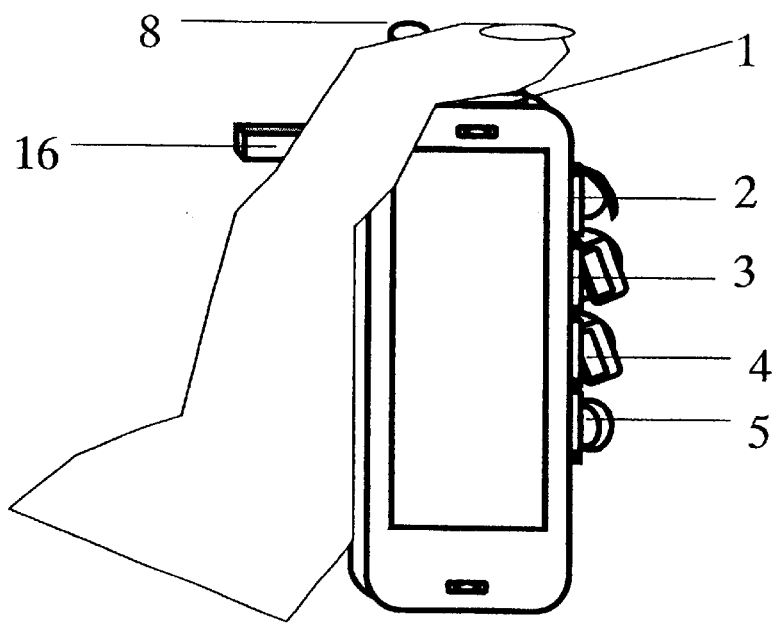
FIG. 6 shows the mobile phone of FIG. 5 being held in a hand.

FIG. 5. shows another preferred embodiment in a mobile phone. The mobile phone has the first key on the top surface 12 and a foldaway hook 16 on the side surface 15. The foldaway hook 16 is normally stored in the mobile phone and opened to use supporting the apparatus during data entry by hooking on the root of thumb finger as illustrated in FIG. 6. Single hand data entry becomes very smooth with well-fixed mobile phone in the palm.

In the present invention, only a five-key keypad is explained, however, other keys can be added for other additional functions.

Because many varying and different embodiments may be made within the scope of the inventive concept discussed here, and because many modifications may be made in the embodiments herein detailed, it is to be understood that the details discuss here are to be interpreted and not intended to limit the invention.

What is claimed is:

1. An apparatus of inputting alpha numerical characters and commands with a single-hand held and operated keyboard comprising:

a housing including front surface, bottom surface, and side surfaces, wherein said front surface or bottom surface has the widest area;

a display located in said front surface;

a rigid foldaway hook provided on said housing;

five keys which are for alpha numerical code entry, and located on said side surfaces and consist of the first key at the thumb position, the second key at forefinger position, the third key at middle finger position, the fourth key at third finger position, and the fifth key at the little finger position when said housing is held by a single hand, each of said five keys comprising a single push type on/off switch; and wherein said first key is located on a different side surface from that of the other four keys;

said first key is provided on said top surface of said side surfaces;

each of said five keys which has electrically-off status normally, and has electrically-on status when the key is pushed;

said housing is held between a root of the thumb and the index finger;

said foldaway hook is provided adjacent said first key and on a side opposite from said second through fifth keys, is normally stored in said housing and is used to support the apparatus during data entry by hooking on a root of the thumb when extended; and the electrically-on and off us of said five keys which is sent to microprocessor electrically to be translated to an alpha numerical letter or a command, whereby inputting of characters and commands is executed by combinations of on/off said five keys.

2. The apparatus in accordance with claim 1, further comprising:

a scrolling ball mouse unit located in said bottom surface.

3. A method of inputting alpha numerical characters and commands using the apparatus of claim 1, said method comprising:

assigning an electrical status of each of the five keys to form a key combination for an alpha numerical character or a command;

sending each key combination to a microprocessor for being electrically interpreted into said alpha numerical letter or a command; and prioritizing each of said key combinations:
first priority: key combinations consisted of one electrically-on key,
second priority: key combinations consisted of one electrically-on neighboring pair, excluding the first key;
third priority: key combinations with electrically-on status of the first key; and wherein groups of key combinations are assigned to groups of letters;

group of letters which are portions of successive alphabetic letters are grouped according to usage frequency from more often used to less often used; and letters "Q", "X" or "Z" are assigned to five key combinations of difficult finger movement wherein the middle finger is electrically-on, the fourth finger is electrically-off, and the little finger is electrically-off.

4. The method in accordance with claim 3, for use with data handling applications wherein the improvement further comprising:

five key status which is hereby expressed with "0" for electrically-off status, and "1" for electrically-on status in order to compose a group of number, combination code, aligned from the first key to the fifth key;

said combination codes which are grouped by prioritizing by entry speed as follows,
First group: "10000,01000,00100,00010,00001"
Second group: "01100,00110,00011"
Third group: "11000,10100,10010,10001"
Fourth group: "11100,10110,10011"
Fifth group: "01110,00111"; said groups of letters which are prioritized by usage frequency as follows,
first group: "A,E,I,O,U"
second group: "R,S,T".
third group: "K,L,M,N"
fourth group: "B,C,D"
fifth group: "G,H"; prioritized letters assigned to combination codes wherein prioritized each combination code is assigned to prioritized each letter respectively in order; and other alphabet letters assigned to combination codes wherein remaining other alphabet letters are assigned to other combination codes by means of easy remembering relating the prioritized 17 letters.

5. The method in accordance with claim 3, for use with data handling applications wherein the improvement further comprising:

five key status which is hereby expressed with "0" for electrically-off status, and "1" for electrically-on status in order to compose a group of number, combination code, aligned from the first key to the fifth key; and 10 digits assigned to combination codes wherein "10000" is for digit 1, "01000" for digit 2, "00100" for digit 3, "00010" for digit 4, "00001" for digit 5, "11000" for digit 6, "01100" for digit 7, "00110" for digit 8, "00011" for digit 9, and "10001" for digit 0.

6. The method in accordance with claim 3, for use with data handling applications wherein the improvement further comprising:

the first and second preset time which are adjustable by the user; a first input information which is valid when time passed said first preset time without any interruption of keypad status after the last keypad is on;

time count which is reset to start new time count whenever the keypad status changes; and a second input information which gives another character or command and is valid when the user continuously pushes keypad(s) until said second preset time.

7. The apparatus according to claim 1, wherein the apparatus comprises a mobile phone.

* * * * *